US012748223B1

(12) United States Patent
Edwards et al.

(10) Patent No.: US 12,748,223 B1
(45) Date of Patent: Sep. 29, 2026

(54) SYSTEM AND METHOD FOR EVENT DETECTION AND HIGH RESOLUTION TIME COMPUTATION

(71) Applicant: National Technology & Engineering Solutions of Sandia, LLC, Albuquerque, NM (US)

(72) Inventors: Eric Emery Edwards, Albuquerque, NM (US); Liam D. Claus, Tucson, AZ (US); Michael Mangan, Corrales, NM (US); Anthony P. Colombo, Albuquerque, NM (US); Quinn Michael Looker, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 291 days.

(21) Appl. No.: 18/488,724

(22) Filed: Oct. 17, 2023

(51) Int. Cl.
*G01T 1/20* (2006.01)

(52) U.S. Cl.
CPC ........ *G01T 1/2006* (2013.01); *G01T 1/20184* (2020.05)

(58) Field of Classification Search
CPC .......................... G01T 1/2006; G01T 1/20184
See application file for complete search history.

(56) References Cited

U.S. PATENT DOCUMENTS

| | | | | |
|---|---|---|---|---|
| 11,009,616 | B2 | 5/2021 | Ramsden et al. | |
| 11,035,964 | B1 | 6/2021 | Lee | |
| 2009/0033532 | A1* | 2/2009 | Reshef | H04N 25/767 341/137 |
| 2009/0132789 | A1* | 5/2009 | Rao | G06G 7/18 712/E9.025 |
| 2010/0025589 | A1* | 2/2010 | Olcott | G01T 1/1647 250/214 R |
| 2013/0161528 | A1* | 6/2013 | Wang | G01T 1/17 250/336.1 |
| 2014/0375855 | A1* | 12/2014 | Nishihara | H04N 25/773 348/301 |
| 2015/0069250 | A1* | 3/2015 | Schmand | G01T 1/20184 250/362 |
| 2022/0035057 | A1* | 2/2022 | Lavelle | G01T 1/248 |
| 2022/0326399 | A1 | 10/2022 | Brodsky et al. | |
| 2024/0430597 | A1* | 12/2024 | An | H03M 1/765 |

* cited by examiner

*Primary Examiner* — Hugh Maupin
(74) *Attorney, Agent, or Firm* — Mark A. Dodd

(57) ABSTRACT

Described herein are technologies related to detecting an event and computing a high resolution time value that indicates when the event was detected. Detector circuitry includes a pixelated array of photodetectors, where the detector circuitry is adapted to detect neutrons upon occurrence of a nuclear event. Timer circuitry includes a coarse counter, first ramp circuitry, and second ramp circuitry, and is adapted to compute a time value with a resolution of between 1-50 picoseconds based upon a count value output by the coarse counter and values of voltage ramps output by the first and second ramp circuitry.

14 Claims, 8 Drawing Sheets

SYSTEM AND METHOD FOR EVENT DETECTION AND HIGH RESOLUTION TIME COMPUTATION

STATEMENT OF GOVERNMENT SUPPORT

This invention was made with Government support under Contract No. DE-NA0003525 awarded by the United States Department of Energy/National Nuclear Security Administration. The U.S. Government has certain rights in the invention.

BACKGROUND OF THE INVENTION

Field of the Invention

The present invention relates to a system and corresponding method for event detection and the computation of a corresponding high resolution time.

Brief Description of the Related Art

Many scenarios exist where it is desirable to detect a time that an event occurred with high resolution. For example, when a nuclear event occurs, gamma rays and neutrons are emitted from a source location. An amount of time required for a neutron to travel from the source location of the nuclear event to a detector is indicative of an amount of energy initially emitted upon occurrence of the nuclear event. Hence, identifying the neutron time of flight (ToF) at a high resolution enables accurate estimation of the initial energy of the nuclear event. Other scenarios also exist where identifying time of occurrence of an event at a high resolution is desirable, including sporting scenarios (e.g., competitive races), computing ToF of lidar signals and/or radar signals, etc.

Conventionally, clocks that cycle relatively quickly (e.g., having a clock rate of between 700 MHz and 5 GHZ) can be employed to compute time values for detected events with a resolution in tenths of nanoseconds. As noted above, however, scenarios exist where detecting events with even more granularity (on the order of picoseconds) is desired. Existing clocks are unable to output time values with such high resolution.

In addition, equipment currently employed to detect certain types of events (such as neutrons released during a nuclear event) is expensive, subject to breakage in harsh environments, and relatively large. With more specificity, measurement of neutron behavior is important in connection with understanding inertial confinement fusion (ICF) and high energy density (HED) physics. As indicated above, neutron ToF can be employed to estimate energy associated with a neutron, and if neutron ToF is measured with sufficient precision, such measurement can provide insights into target fusion conditions through neutron burn history and ion temperature. Neutron ToF detectors have been unchanged for many years. A conventional neutron ToF detector includes a monolithic neutron-to-photon converter (a scintillator or Cherenkov radiator) and a photo multiplier tube (PMT), where the converter is coupled to the PMT. Temporal response of these detectors is described by the Instrument Response Function (IRF), which indicates that the typical temporal response is a few nanoseconds. Limitations of the IRF constrain the neutron ToF measurement in three ways: 1) neutron ToF measurements are immediately preceded by a fairly intense photon flash that saturates the detector, and the IRF slows the recovery that must happen prior to capturing neutron data; 2) the IRF-limited temporal resolution dictates the minimum detector-to-source distance needed to obtain acceptable energy discrimination; 3) the time scale required to obtain high fidelity neutron burn history and ion temperature is much shorter (hundreds of picoseconds) than the typical IRF, and such measurements can only be achieved with significant characterization and postprocessing. In practice, these drawbacks constrain the proximity of the detector to the target (the source location), impose on scarce facility lines-of-sight, and limit the quality of the data that can reasonably be obtained.

SUMMARY OF THE INVENTION

The following is a brief summary of subject matter that is described in greater detail herein. This summary is not intended to be limiting as to the scope of the claims.

Described herein are various technologies pertaining to detecting events at a relatively high resolution in time (with a resolution in time of 100 picoseconds or less). With more particularity, detector circuitry and timer circuitry are described herein, where the detector circuitry and the timer circuitry can be operated independently from one another or together in connection with identifying times, at high resolution, when events are detected.

The detector circuitry is configured to detect neutrons that travel through an environment after a nuclear event has occurred (such as a nuclear explosion in a nuclear reactor). As noted above, a conventional neutron time of flight (ToF) detector includes a monolithic neutron-to-photon converter and a photo multiplier tube (PMT). The detector circuitry described herein, rather than including such elements, comprises an array of photodetectors. In an example, the photodetectors are single photon avalanche diodes (SPADs), although other photodetectors (such as phototransistors or photodiodes) are contemplated. The inventors observed that a neutron impinging upon a photodetector dislodges charged particles in the photodetector, thereby resulting in the photodetector emitting current. The photodetectors in the array of photodetectors can be relatively small (approximately 100 μm by 100 μm or less) with each photodetector having a temporal resolution below 100 picoseconds, thereby resulting in achievement of 40 to 80 times faster IRF when compared to existing diagnostics. As the detector circuitry includes an array of photodetectors, many photodetectors remain ready for neutron ToF measurements even as other photodetectors in the array are impinged upon by neutrons. Moreover, the relatively small size and fast response of the photodetectors enables greater flexibility in placement of detector circuitry at multiple locations, such as in a chamber of a nuclear reactor.

The timer circuitry described herein is configured to output a time value that is indicative of a time when an event is detected (e.g., by the detector circuitry referenced above or other detection mechanism), where the time value has a resolution in time of between 1 and 10 picoseconds. The timer circuitry includes a coarse counter that updates a count value with every cycle of a clock. For example, the clock can be a 700 MHz clock. In another example, the clock can be a 1 GHz to 5 GHz clock. The timer circuitry additionally includes first ramp circuitry and second ramp circuitry. The first ramp circuitry is configured to generate a first sequence of ramps, with each ramp in the first sequence of ramps decreasing (or increasing) in voltage over time. The second ramp circuitry is configured to generate a second sequence of ramps, with each ramp in the second sequence of ramps decreasing (or increasing) in voltage over time, with ramps in the first sequence of ramps and ramps in the second sequence of ramps having magnitude changes in the same direction (e.g., decreasing or increasing). The first sequence of ramps and the second sequence of ramps are offset in time with respect to one another, although each of the ramps has a same duration in time. In an example, each ramp output by either the first ramp circuitry or the second ramp circuitry has a duration in time of approximately 1.5 clock cycles, where each ramp in the first sequence of ramps is offset in time with respect to a corresponding ramp in the second sequence of ramps by 0.5 clock cycles.

Upon the timer circuitry receiving a detection signal that indicates that an event has been detected, a count value is read from the counter. Further, voltage value(s) of at least one ramp generated by the first ramp circuitry and/or the second ramp circuitry are obtained. Based upon the voltage value(s), resolution of the count value read from the counter is increased. Specifically, a high resolution value is determined based upon the ramp value(s), and the high resolution value is appended to the count value read out from the counter, thereby producing a time value of high resolution. In an example, based upon values of ramps generated by the first and second ramp circuitry at the time that the timer circuitry received the detection signal, a high resolution value can be estimated based upon content of a lookup table (where the lookup table maps ramp voltage values to high resolution values). The timer circuitry is particularly well-suited for applications where time of event occurrence is desirably detected at high resolution, where such applications include determining neutron ToF.

As indicated previously, the detector circuitry and the timer circuitry can optionally be employed together, such as in connection with identifying neutron ToF. In a laboratory setting (such as within a chamber of nuclear reactor), a start time of the nuclear event can be controlled and known, thereby allowing for precise computation of neutron ToF with respect to neutrons released during the nuclear event. For example, a neutron released during a controlled nuclear explosion can impinge upon a photodetector in the array of photodetectors and dislodge a charged particle, which in turn causes the photodetector to emit current (that can be subsequently amplified). The amplified signal is compared with a threshold, and when the amplified signal exceeds the threshold a detection signal is generated and directed to the timer circuitry. The timer circuitry receives the detection signal; in response to receiving the detection signal, the timer circuitry outputs a count value of the coarse counter and values of voltage ramps generated by the first and second ramp circuitry are obtained. A high resolution time value can then be computed, where such time value is indicative of when the neutron impinged upon the photodetector. As described above, such time value includes the count value and a high resolution value appended thereto, where the high resolution value is based upon values of ramps output by the first and second ramp circuitry when the timer circuitry received the detection signal. Since the start time of the nuclear event is known, the high resolution time value can be employed to compute time of flight of the neutron. The time of flight of the neutron can be used to estimate energy discharged during the nuclear event.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

DETAILED DESCRIPTION OF THE INVENTION

Figure 1:
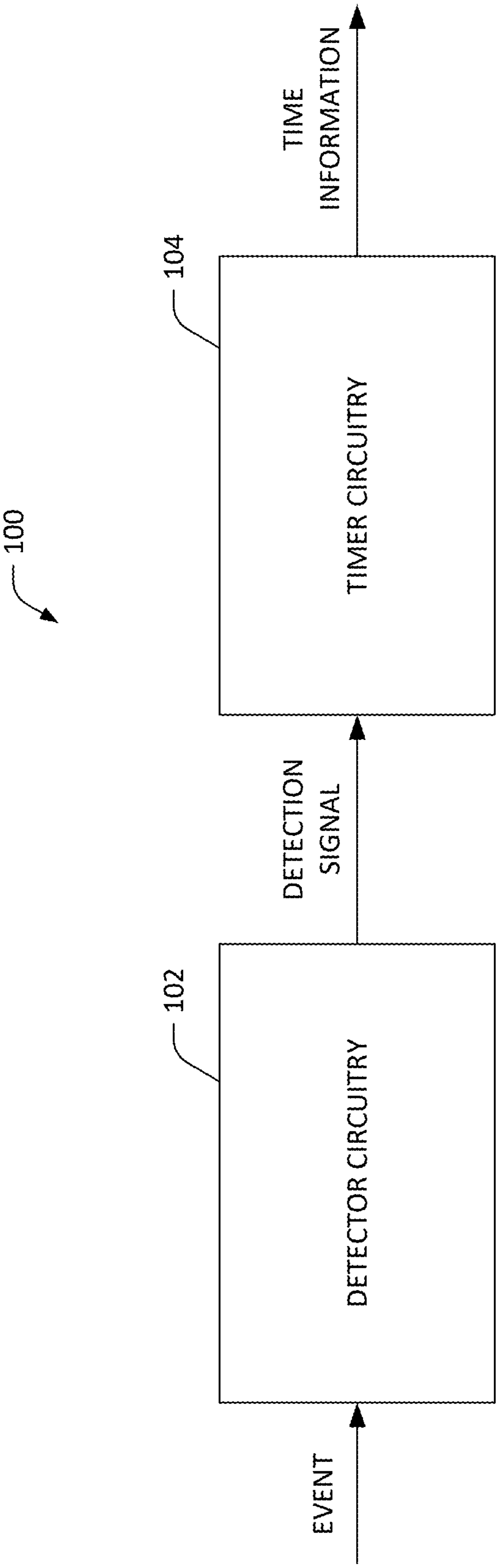
FIG. 1 is a functional block diagram of a system that facilitates detecting occurrence of an event and identifying a time when the event was detected at high resolution.

Various technologies pertaining to detecting events and determining, with relatively high resolution (such as on the order of picoseconds), when the events were detected are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term “or” is intended to mean an inclusive “or” rather than an exclusive “or.” That is, unless specified otherwise, or clear from the context, the phrase “X employs A or B” is intended to mean any of the natural inclusive permutations. That is, the phrase “X employs A or B” is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Described herein are various technologies pertaining to detecting events and further pertaining to determining when the events were detected at high resolution (on the order of picoseconds). With more particularity, detector circuitry and timer circuitry are described herein, where the detector circuitry can be employed independent of the timer circuitry or together with the timer circuitry, and the timer circuitry can be employed independent of the detector circuitry or together with the detector circuitry. Pursuant to an example, the technologies described herein are particularly well-suited for detecting neutrons that travel through an environment in response to occurrence of a nuclear event (such as a nuclear explosion in a chamber of a nuclear reactor) and are further well-suited for use in connection with computing time of flight (ToF) of the detected neutrons. ToF of a neutron after a nuclear event is indicative of an amount of energy initially expelled during such event. Accordingly, through utilization of the technologies described herein, an amount of energy initially expelled during a nuclear event that has occurred in a nuclear reactor can be estimated. It is to be understood, however, that the technologies described herein can be employed in other applications where determining an amount of time associated with detection of an event is desirably determined at high resolution, such as in radar applications, lidar applications, and the like. Further, the technologies described herein can be employed in connection with sporting events, such as races, to precisely determine time information.

Referring now to FIG. 1, a functional block diagram of a system 100 that is configured to detect an event and determine a time that the event was detected with high resolution is illustrated. In examples, high resolution refers to a resolution between 1 and 50 picoseconds, between 1 and 20 picoseconds, or between 1 and 5 picoseconds. The system 100 includes detector circuitry 102 and timer circuitry 104, where the timer circuitry 104 is configured to receive a detection signal output by the detector circuitry 102, and further where the detector circuitry 102 is configured to output the detection signal upon the detector circuitry 102 detecting an event. In an example, the event is a neutron impinging upon a portion of the detector circuitry 102. In another example, the event is a lidar signal or radar signal impinging upon a portion of the detector circuitry 102. Other events are contemplated.

In an example, the detector circuitry 102 includes a scintillator in optical communication with a photomultiplier tube (PMT). The scintillator emits light when excited by ionizing radiation, and the PMT generates an electrical signal (the detection signal) in response to photons emitted by the scintillator impinging upon the PMT. In such an example, the detected event is the ionizing radiation exciting the scintillator. In another example, the detector circuitry 102 includes photodetectors that output electrical signals upon being impacted by radiation of certain wavelengths (radar signals, lidar signals, etc.), where the electrical signals are detection signals. In yet another example, the detector circuitry 102 includes an array of photodetectors, wherein when a neutron impinges upon a photodetector in the array, a charged particle in the photodetector is dislodged, potentially resulting in a photon flash. The dislodging of the charged particle(s) causes the photodiode to emit a (relatively small) electrical signal, where the emitted electrical (or an amplification of the electrical signal) signal is the detection signal.

As noted above, the timer circuitry 104 receives the detection signal output by the detector circuitry 102, where the timer circuitry 104 outputs data that can be used to determine a high resolution time value that identifies when the detection signal was received by the timer circuitry 104. A calibration procedure can be undertaken to estimate response time of the detector circuitry 102 and travel time of the electrical signal from the detector circuitry 102 to the timer circuitry 104. Hence, output of the timer circuitry 104 can be employed to determine when the detector circuitry 102 initially detected the event. In an example, the timer circuitry 104 includes a counter that is in communication with a relatively fast clock. For example, the clock is a 700 MHz clock. In another example, the clock is a 1-2 GHZ clock. In yet another example, the clock is a 2-3 GHZ clock. In still yet another example, the clock is a 3-5 GHz clock.

The timer circuitry 104, in addition to including a counter that is driven by a clock, can include first ramp circuitry and second ramp circuitry. The first ramp circuitry outputs a first sequence of voltage ramps. The second ramp circuitry outputs a second sequence of voltage ramps. Each voltage ramp in the first sequence of voltage ramps and the second sequence of voltage ramps decreases in voltage over time. Moreover, each ramp in the first sequence of voltage ramps and the second sequence of voltage ramps can have approximately the same duration in time. In addition, ramps in the first sequence of ramps are offset in time from corresponding ramps in the second sequence of ramps. In a specific example, ramps in the first sequence of ramps and second sequence of ramps have a duration in time of 1.5 clock cycles, and ramps in the second sequence of ramps are delayed from ramps in the first sequence of ramps by 0.5 clock cycles. When the timer circuitry 104 receives the detection signal, a value from the counter can be read out as a coarse time value. Further, values of the ramps can be obtained and used to determine a high resolution value that can be appended to the coarse time. These aspects will be described in greater detail below.

Figure 2:
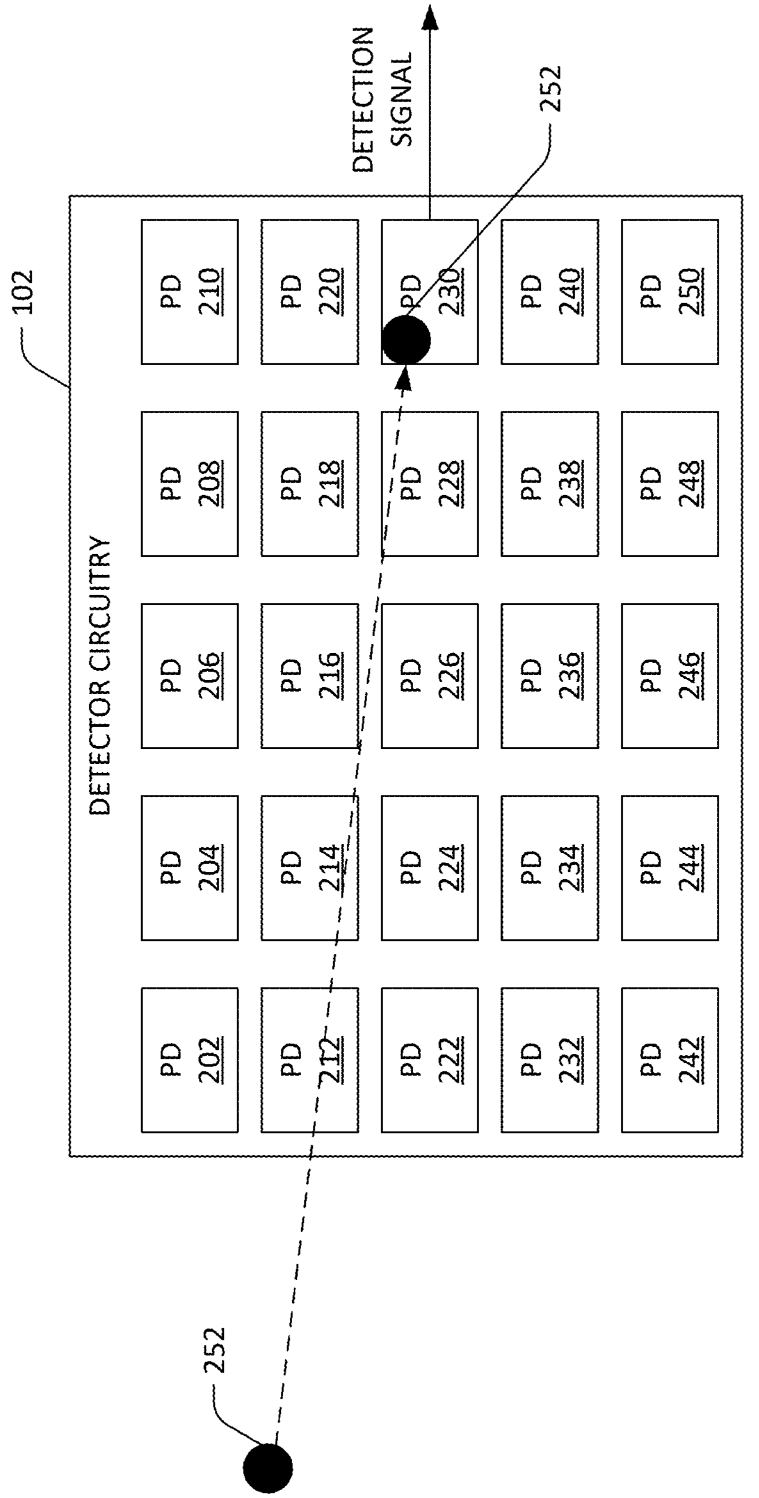
FIG. 2 is a schematic that depicts detector circuitry that is configured to detect neutrons travelling through an environment.

Referring now to FIG. 2, a schematic depicting an embodiment of the detector circuitry 102 is presented. The detector circuitry 102 includes an array of photodetectors 202-250. In an example, the photodetectors 202-250 are or include single photon avalanche diodes (SPADs). In other examples, the photodetectors 202-250 are or include photodiodes, phototransistors, infrared detectors, and/or the like. CMOS technology can be employed to build the array of photodetectors 202-250, where the photodetectors 202-250 can be single-hit detectors (e.g., a photodetector may become inoperable after detecting an event). Each of the photodetectors 202-250 can be relatively small, such as approximately 100 μm by 100 μm, approximately 80 μm by 80 μm, approximately 60 μm by 60 μm, or the like. The photodetectors 202-250 can have sub-100 picosecond temporal resolution, enabling achievement of 40-80 times faster IRFs than existing diagnostics. Further, in the architecture depicted in FIG. 2, many photodetectors in the array of photodetectors 202-250 can remain ready for detecting neutrons even as other photodetectors in the array are occupied by a photon flash or other detection event.

Moreover, the detector circuitry 102 can be a pixelated array, where the detector circuitry 102 includes numerous pixels, with each pixel including a photodetector and associated circuitry. For instance, and as will be described in greater detail herein, each pixel can include a photodetector, an amplifier, and timer circuitry. Therefore, the detector circuitry 102 can substantially simultaneously detect several neutrons that have impacted several photodetectors. As illustrated in FIG. 2, a neutron 252 travels through an environment upon a nuclear event occurring and impinges upon the photodetector 230. The neutron 252 dislodges a charged particle in the photodetector 230. The dislodged particle causes the photodetector 230 to emit an electrical signal (current). The electrical signal is amplified and compared with a threshold, and when the amplified signal is above the threshold, the detector circuitry 102 outputs a detection signal that indicates that the neutron 252 impacted the photodetector 230.

Figure 3:
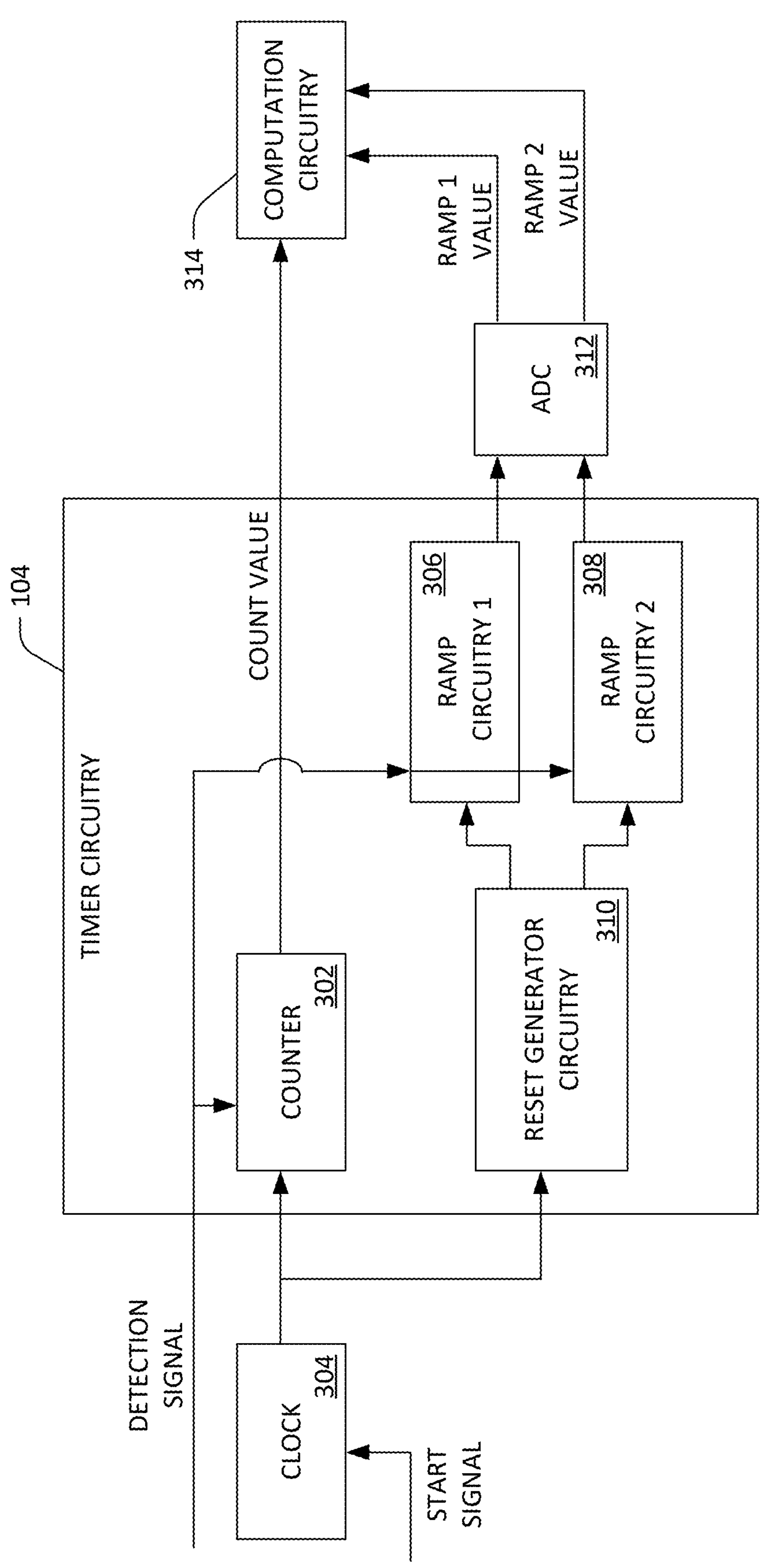
FIG. 3 is a schematic of timer circuitry that is adapted for use in connection with determining a time when an event was detected, where the determined time is in high resolution.

Now referring to FIG. 3, an embodiment of the timer circuitry 104 is depicted. The timer circuitry 104 includes a counter 302 that is in communication with a clock 304. While the clock 304 is shown as being external to the timer circuitry 104, the timer circuitry 104 can optionally include the clock 304. The timer circuitry 104 additionally includes first ramp circuitry 306 and second ramp circuitry 308. The first ramp circuitry 306 is adapted to output a first sequence of voltage ramps, where each voltage ramp in the first sequence of voltage ramps decreases in voltage from a first voltage value to a second voltage value over a duration in time. Similarly, the second ramp circuitry 308 is adapted to output a second sequence of voltage ramps, where each voltage ramp in the second sequence of voltage ramps decreases in voltage from the first voltage value to the second voltage value over the duration in time. In an example, the duration in time corresponds to 1.5 clock cycles of the clock 304. In another example, the duration in time is between 1.5 and 2 clock cycles (but less than two clock cycles) of the clock 304. The first ramp circuitry 306 can include a first capacitor that is periodically charged and discharged, while the second ramp circuitry 308 can include a second capacitor that is periodically charged and discharged, such that voltage ramps output by the first ramp circuitry 306 and the second ramp circuitry 308 are periodic in nature and decrease in voltage approximately linearly over the duration in time.

Further, ramps in the second sequence of voltage ramps output by the second ramp circuitry 308 are delayed in time relative to corresponding ramps in the first sequence of voltage ramps output by the first ramp circuitry 306. For instance, a ramp in the second sequence of ramps is delayed by 1 clock cycle relative to a corresponding ramp in the first sequence of ramps. While not illustrated, the timer circuitry 104 can further include third ramp circuitry that outputs a third sequence of voltage ramps, where each voltage ramp in the third sequence of ramps decreases in voltage from the first voltage value to the second voltage value over the duration in time. When the timer circuitry 104 includes the third ramp circuitry, the duration in time can be 2.5 clock cycles. In addition, each ramp in the third sequence of ramps is delayed in time relative to corresponding ramps in the first sequence of ramps and the second sequence of ramps.

The timer circuitry 104 also includes reset generator circuitry 310 that is in communication with the clock 304, the first ramp circuitry 306, and the second ramp circuitry 308. The reset generator circuitry 310 is adapted to receive clock signals emitted from the clock 304 and is further adapted to cause the first ramp circuitry 306 and the second ramp circuitry 308 to periodically charge and discharge, such that the first ramp circuitry 306 and the second ramp circuitry 308 output the first sequence of voltage ramps and the second sequence of voltage ramps, respectively. The ramp generator circuitry 310 can include any suitable circuitry that is adapted to control the first ramp circuitry 306 and the second ramp circuitry 308 to emit the first sequence of ramps and the second sequence of ramps with the offsets in time described above.

An analog to digital converter (ADC) 312 is electrically coupled to the first ramp circuitry 306 and the second ramp circuitry 308 and is adapted to output digital values for voltages of the ramps output by the first ramp circuitry 306 and the second ramp circuitry 308. Computation circuitry 314 is in communication with the counter 302 and the ADC 312 and is adapted to compute a time value with high resolution based upon a count value output by the counter 302 and at least one of the digital values output by the ADC 312 that is representative of the ramp voltages of ramps output by the first ramp circuitry 306 and the second ramp circuitry 308. While the ADC 312 and the computation circuitry 314 are depicted in FIG. 3 as being external to the timer circuitry 104, in other embodiments the timer circuitry 104 includes the ADC 312 and the computation circuitry 314.

Figure 4:
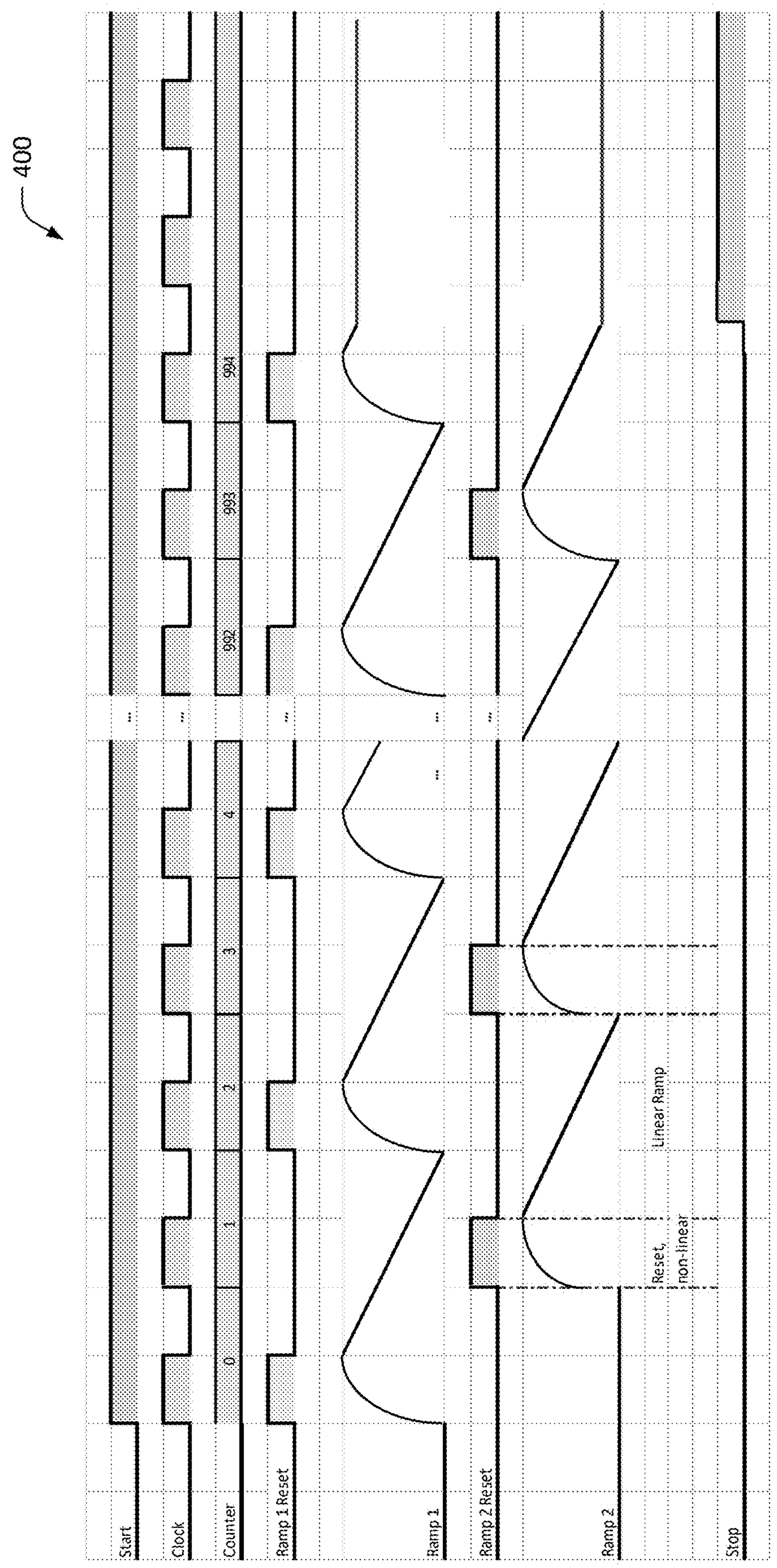
FIG. 4 is a timing diagram that depicts voltage levels over time associated with componentry of timer circuitry.

FIG. 4 is a timing diagram 400 that illustrates outputs of the clock 304, the reset generator circuitry 310, the first ramp circuitry 306, and the second ramp circuitry 308 over time. Operation of the timer circuitry 104 is now described with reference to FIGS. 3 and 4. The clock 304 receives a start signal, indicating that the timer circuitry 104 is to be started. For example, the start signal can indicate that a nuclear event has been initiated in a nuclear reactor. In another example, the start signal can indicate that a lidar or radar signal has been emitted from a lidar or radar system. The clock 304 generates clock signals at a predefined frequency upon receipt of the start signal. The counter 302 maintains a coarse count based upon the clock signals output by the clock 304 (e.g., the counter 302 increments the count for each complete clock cycle of the clock 304). The reset generator circuitry 310 receives clock signals output by the clock 304 and controls the first ramp circuitry 306 and the second ramp circuitry 308 based upon the clock signals received from the clock 304.

For instance, as illustrated in FIG. 4, the reset generator circuitry 310 causes the first capacitor in the first ramp circuitry 306 to charge upon receiving a rising edge that denotes a beginning of a first clock cycle. For instance, the reset generator circuitry 310 can close a first switch that couples a voltage source and the capacitor, thereby causing such capacitor to charge. After 0.5 clock cycles, the reset generator circuitry 310 can open the first switch and, for instance, close a second switch that couples the first capacitor to ground. Hence, the first capacitor discharges voltage approximately linearly for 1.5 clock cycles, at which point the reset generator circuitry 310 causes the first capacitor to be recharged. As depicted in FIG. 4, the reset generator circuitry 310 causes the first ramp circuitry 306 to charge every 2 clock cycles, where 0.5 clock cycles are employed in connection with charging the first ramp circuitry 306.

After one clock cycle, and while the first ramp circuitry 306 is linearly discharging voltage, the ramp reset circuitry 310 receives the rising edge that denotes the start of a second clock cycle; upon receiving the rising edge of the second clock cycle, the ramp reset circuitry 310 causes the second ramp circuitry 308 (e.g., the second capacitor in the second ramp circuitry 308) to charge. As can be ascertained, voltage ramps output by the second ramp circuitry 308 are delayed in time by 1 clock cycle from voltage ramps output by the first ramp circuitry 306. The counter 302 continues to increment a count based upon clock signals emitted from the clock 304, and the first ramp circuitry 306 and the second ramp circuitry 308 continue to periodically output voltage ramps based upon clock signals output by the clock 304.

Subsequent to the start signal being received, a detection signal (e.g., stop signal) is received (e.g., from the detection circuitry 102). The counter 302 ceases to increment the count upon the detection signal being received. In addition, immediately responsive to the detection signal being received, values of the voltage ramps output by the first ramp circuitry 306 and the second ramp circuitry 308 are obtained and converted to digital values by the ADC 312. Based upon at least one of these values, a high resolution value is computed by the computation circuitry 314. For example, the rate of discharge of the first ramp circuitry 306 and the second ramp circuitry 308 can be known, and the duration of the ramp is known. Accordingly, an intermediate amount of time within any given clock cycle can be estimated at high resolution. For instance, and with reference to FIG. 4, upon the detection signal being received, a voltage ramp output by the first ramp circuitry 306 has a relatively high value (indicating that the voltage ramp is near a beginning of discharge), while a ramp output by the second ramp circuitry 308 has a relatively low value, thereby indicating that the second ramp is near an end of discharge. Using such values, the computation circuitry 314 can estimate a high resolution value that corresponds to approximately 70% of a clock cycle. Thus, a time value with high resolution can be computed.

With continued reference to FIG. 4, it can be ascertained that the detection signal can be received when one of the first ramp circuitry 306 or second ramp circuitry 308 is charging. While the timing diagram 400 shows that the first ramp circuitry 306 and the second ramp circuitry 308 charge within 0.5 clock cycles, in reality the first ramp circuitry 306 and the second ramp circuitry 308 charge more quickly than 0.5 clock cycles (with currently available clock speeds). During a window of time when one of the first ramp circuitry 306 or the second ramp circuitry 308 is charging, a value of only one ramp can be employed to estimate the high resolution value. For example, if the detection signal was received shortly after the counter 302 incremented the count to three, the second ramp circuitry 308 is being charged. A value of the voltage ramp output by the first ramp circuitry 306, however, can be employed to ascertain that the time when the detection signal was received is shortly after the start of a clock cycle. Put differently, the computation circuitry 314 can estimate the high resolution value based only upon a voltage value of a voltage ramp output by the first ramp circuitry 306. After the computation circuitry 314 receives the coarse count value of the counter 302 and computes the high resolution value based upon at least one ramp value, the computation circuitry 314 can append the high resolution value to the coarse count value to compute the high resolution time value.

Other embodiments with respect to the ramps illustrated in FIG. 4 are also contemplated. For instance, while the ramps output by the first ramp circuitry 306 and the second ramp circuitry 308 are illustrated as decreasing in voltage, in other embodiments, the first ramp circuitry 306 and/or the second ramp circuitry 308 can output ramps that increase in voltage; for instance, the first ramp circuitry 306 and the second ramp circuitry 308 can include a capacitor that is slowly charged and then discharged quickly (e.g., through use of a resistor). Moreover, while the ramps are depicted as decreasing linearly, it is to be understood that ramps output by the first ramp circuitry 306 and the second ramp circuitry 308 can be nonlinear, so long as such ramps are continuously decreasing in voltage or increasing in voltage.

Figure 5:
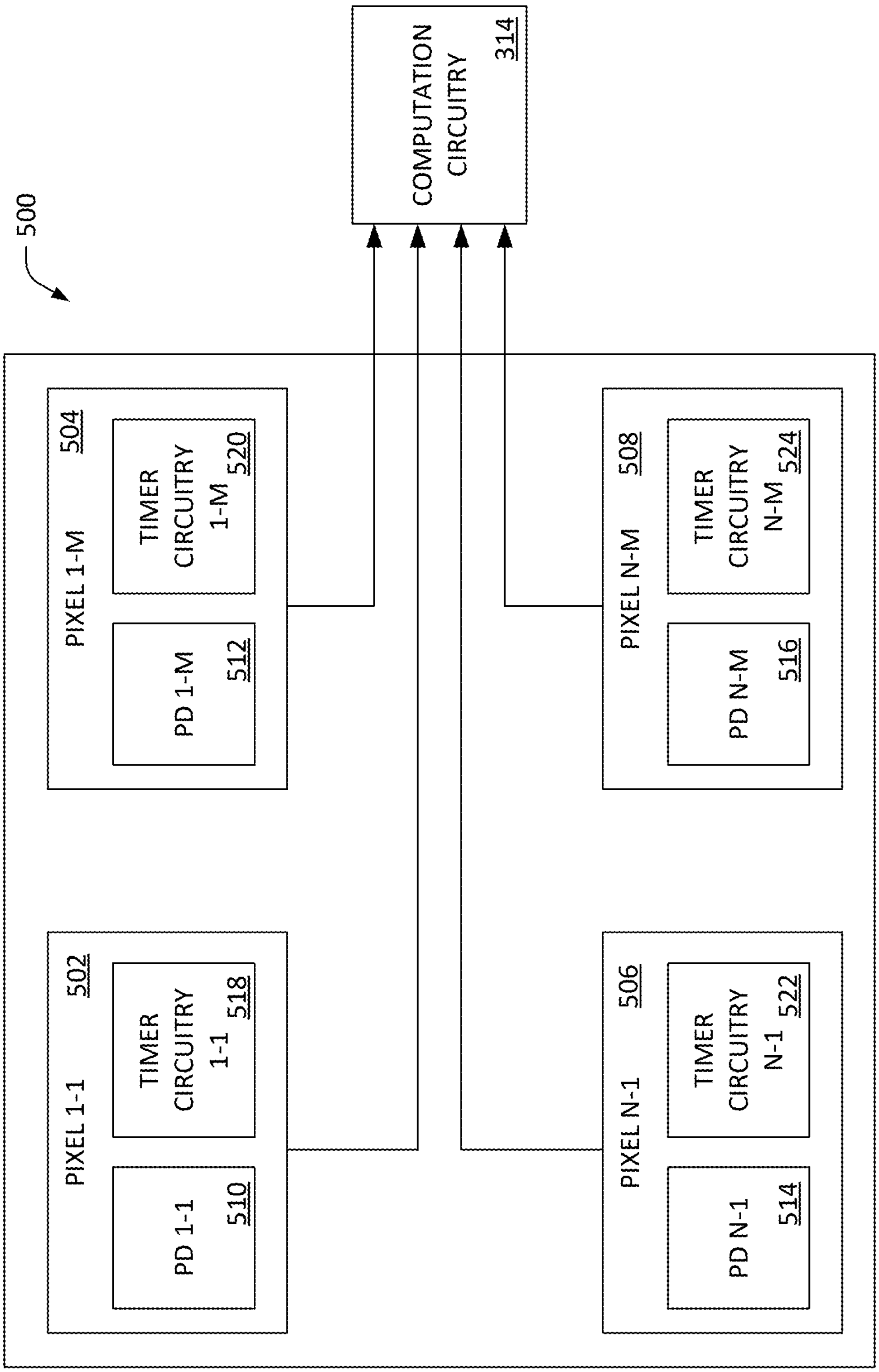
FIG. 5 depicts an arrayed detector that includes several pixels, where each pixel includes a photodetector and timer circuitry.

Now referring to FIG. 5, a detector array 500 is illustrated. The detector array 500 includes N×M pixels 502-508 arranged in a two-dimensional array. The pixels 502-508 include respective photodetectors 510-516 and respective timer circuitry 518-524. Thus, each pixel includes both a photodetector and timer circuitry. A clock (not shown) is in communication with each instance of the timer circuitry (timer circuitry 518-524). The computation circuitry 314 is also in communication with the timer circuitry of the pixels 502-508. Therefore, for example, the computation circuitry 314 computes high resolution time values based upon detection signals generated by several of the photodetectors in the pixelated array 500.

In a detailed example, a clock is coupled to each instance of the timer circuitry (the timer circuitry 518-524). At a first point in time, a first neutron impinges upon photodetector 510. The photodetector 510 outputs a detection signal, and the timer circuitry 518 outputs a coarse count value and voltage values of two ramps. The computation circuitry 314 receives the coarse count value and the voltage values of the two ramps and computes a high resolution time value that is indicative of when the first neutron impinged upon the photodetector 510. At a substantially similar time, a second neutron impinges upon photodetector 512. The photodetector 512 generates a detection signal and the timer circuitry 520 outputs a coarse time value generated by a counter and voltage values of two voltage ramps produced by the timer circuitry 520. The computation circuitry 314 computes a high resolution time value that is indicative of when the second neutron impinged upon the photodetector 512 based upon the information received from the timer circuitry 520. Hence, the pixelated array 500 can detect multiple neutrons that are traveling in an environment of the pixelated array 500 and can be employed in connection with computing high resolution time values that identify when the neutrons impinged upon photodetectors of the pixelated array 500.

Figure 6:
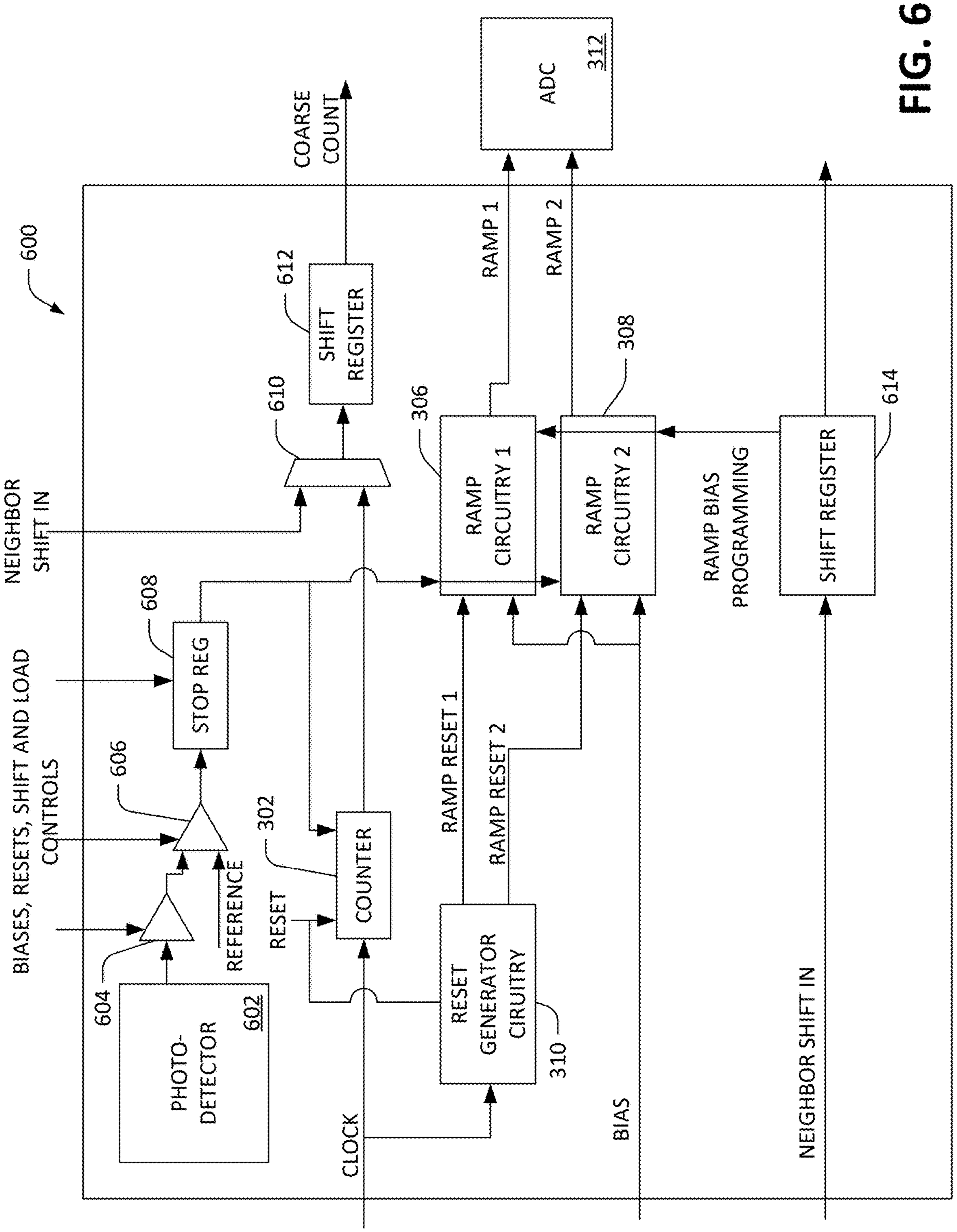
FIG. 6 is a schematic that depicts an embodiment of a pixel of an arrayed detector.

Now referring to FIG. 6, a schematic that illustrates a pixel 600 in the pixelated array 500 is presented. The pixel 600 includes a photodetector 602, such as a SPAD. An amplifier 604 is coupled to the output of the photodetector 602 and amplifies electrical signals output by the photodetector 602. The pixel 600 further includes a comparator 606 that compares the amplified output of the photodetector 602 with a reference signal. When a magnitude of the amplified signal exceeds a magnitude of the reference signal, the comparator 606 outputs a detection signal. In an example, a stop register 608 is coupled to the comparator 606. In addition, the stop register 608 is in communication with the counter 302, the first ramp circuitry 306, and the second ramp circuitry 308. The stop register 608 is configured to output a stop signal to the first ramp circuitry 306 and the second ramp circuitry 308.

The counter 302 receives clock signals from the clock. A buffer 610 is coupled to the counter 302 and is further coupled to a shift register of a neighboring pixel in the array 500. The pixel 600 also includes a shift register 612 that is coupled to the buffer 610; this architecture is utilized to globally synchronize outputs of the counters across the pixelated array 500.

The pixel 600 further includes the reset generator circuitry 310, the first ramp circuitry 306, and the second ramp circuitry 308. The reset generator circuitry 310, as described above, controls charging and discharging of the first ramp circuitry 306 and the second ramp circuitry 308. Optionally, the reset generator circuitry 310 is coupled to the counter 302 and can be employed to cause the counter 302 to reset a count value. The pixel 600 can further optionally include another shift register 614 that is configured to provide bias programming to the first and second ramp circuitry 306 and 308; the shift register 614 can provide information as to bias programming based upon information received from an adjacent pixel in the pixelated array 500, such that the bias programming is consistent across pixels in the pixelated array 500. A bias source provides bias voltage to the first and second ramp circuitry 306 and 308. The ADC 312 receives outputs of the ramp circuitry 306 and 308 and converts such output to digital values, which are employed by the computation circuitry 314 to compute a high resolution time value that is indicative of, for example, a precise time that a neutron impacted the photodetector 602.

Figure 7:
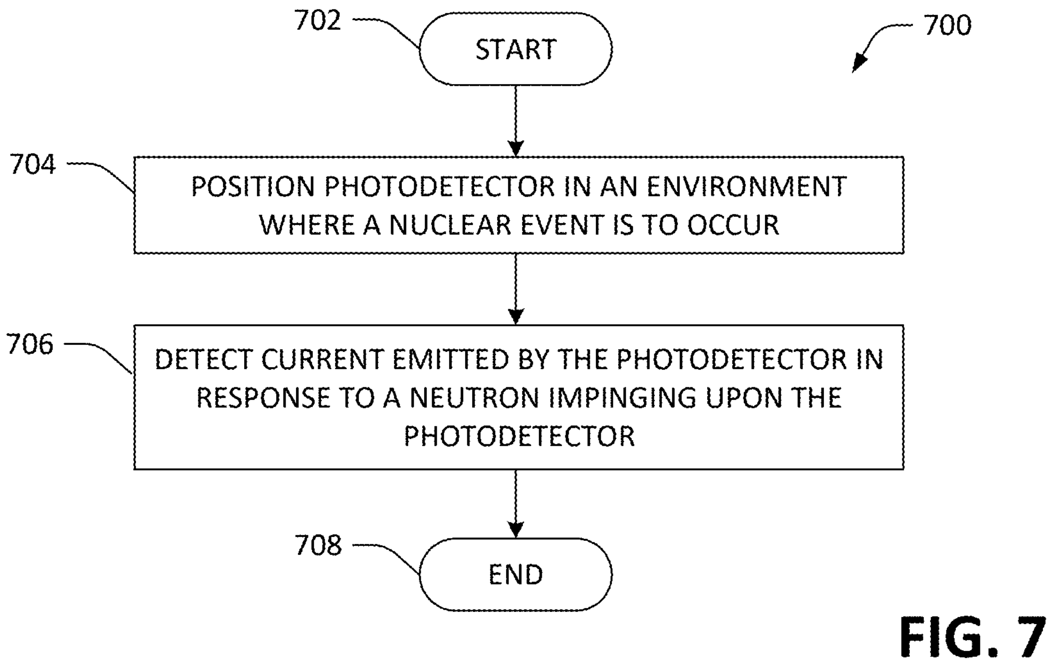
FIG. 7 is a flow diagram that illustrates a method for detecting a neutron through utilization of a photodetector.
Figure 9:
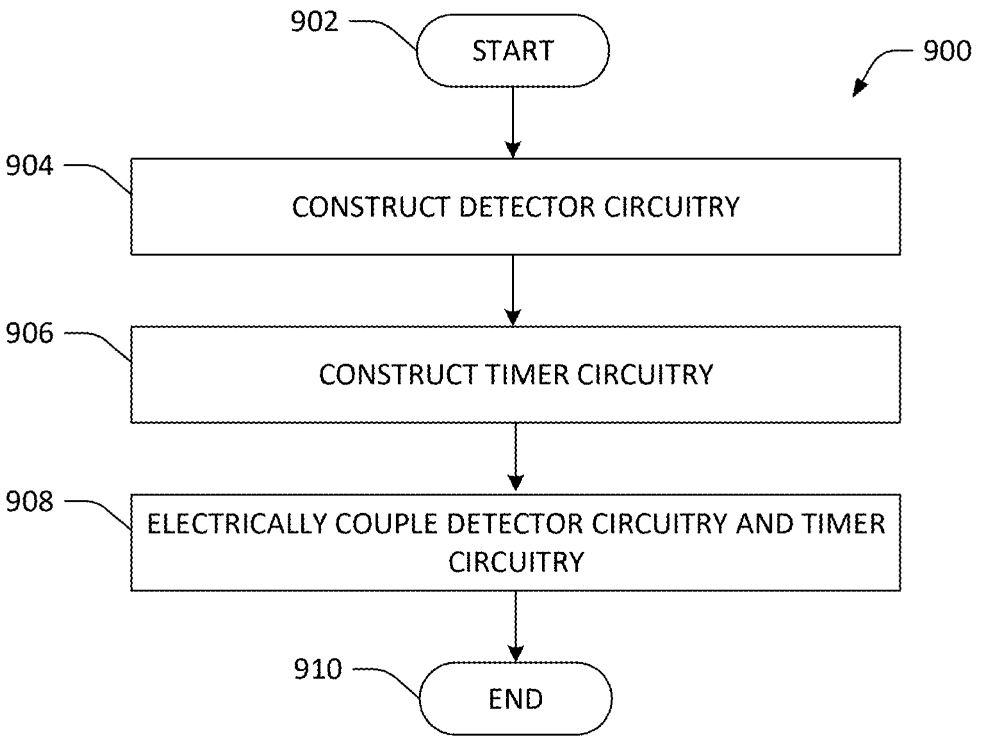
FIG. 9 is a flow diagram that illustrates a method for constructing circuitry that detects arrival of a neutron and computes time of flight of the neutron at high resolution.
Figure 8:
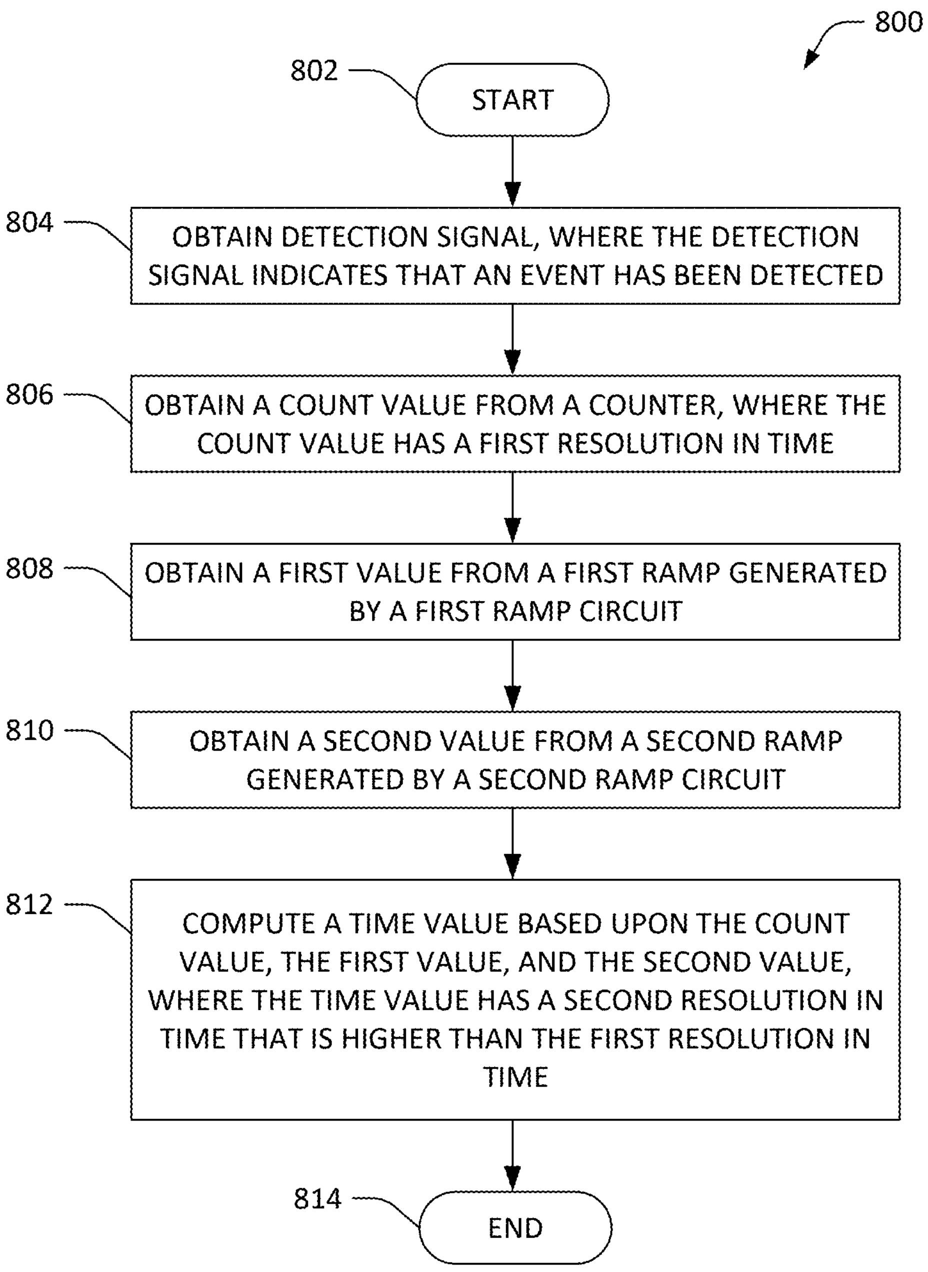
FIG. 8 is a flow diagram that illustrates a method for computing a time value that identifies when an event was detected by detector circuitry, where the time value is in high resolution.

FIGS. 7-9 illustrate methodologies relating to detectors and/or timers. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Referring now to FIG. 7, a method 700 for detecting a neutron that has traveled through an environment is illustrated. The method 700 starts at 702, and at 704, a photodetector is positioned in an environment where a nuclear event is to occur. For example, the photodetector is positioned in a chamber of a nuclear reactor in a laboratory environment. Subsequent to the photodetector being positioned in the environment, the nuclear event occurs. At 706, current emitted by the photodetector is detected, where the photodetector emits the current in response to a neutron impinging upon the photodetector. As described previously, a neutron traveling through an environment can dislodge a charged particle in a photodetector, resulting in the photodetector generating an electrical signal. In an example, the neutron impinging upon the photodetector can cause a photon flash, and the photodetector emits current by way of the photoelectric effect. In another example, the dislodged charge particle is an electron. The photodetector emitting the electrical signal indicates that the photodetector was impacted by a neutron. The method 700 completes at 708.

Turning to FIG. 8, a method 800 for computing a time when an event is detected, where the time is computed with high resolution, is illustrated. The method 800 starts at 802, and at 804, a detection signal is obtained, where the detection signal indicates that an event has been detected. In an example, the detection signal is generated by a PMT. In another example, the detection signal is generated by a photodiode. In yet another example, the detection signal is generated by a SPAD.

At 806, a count value is obtained from a counter, where the count value has a first resolution in time. For instance, the account value is generated based upon output of a 700 MHz to 5 GHz clock. At 808, a first value is obtained from a first ramp output by a first ramp circuit, such as the first ramp circuitry 306. The first value corresponds in time to when the detection signal was obtained. At 810, a second value is obtained from a second ramp output by a second ramp circuit, such as the second ramp circuitry 308. At 812, a high resolution time value is computed based upon the count value, the first value, and the second value, where the high resolution time value has a second resolution in time that is higher than the first resolution in time of the count value obtained from the counter. The method 800 completes at 814.

Turning now to FIG. 9, a method 900 for constructing a pixel of a pixelated array is illustrated. The method starts at 902, and at 904, detector circuitry is constructed. The detector circuitry may include a photodetector, such as a photodiode. In another example, the detector circuitry includes a scintillator and a PMT. At 906, timer circuitry is constructed. As described above, the timer circuitry can include a counter, first ramp circuitry, and second ramp circuitry. At 908, the detector circuitry constructed at 904 and the timer circuitry constructed at 906 are electrically coupled, such that output of the detector circuitry is received by the timer circuitry. The method 900 completes at 910.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
- timer circuitry comprising:
  - a counter adapted to generate count values;
  - first ramp circuitry adapted to output a first voltage ramp; and
  - second ramp circuitry adapted to output a second voltage ramp; and
- computation circuitry adapted to compute a high resolution time value that is indicative of a time that the timer circuitry received an event detection signal, the high resolution time value having a resolution of 1-5 picoseconds, the computation circuitry being adapted to compute the high resolution time value based upon:
  - a count value generated by the counter corresponding to the time that the timer circuitry received the event detection signal; and
  - at least one of:
    - a first voltage value of the first voltage ramp, the first voltage value corresponding to the time that the timer circuitry received the event detection signal; or
    - a second voltage value of the second voltage ramp, the second voltage value corresponding to the time that the timer circuitry received the event detection signal.

2. The system of claim 1, wherein the first voltage ramp and the second voltage ramp are offset in time with respect to one another.

3. The system of claim 1, wherein the computation circuitry is adapted to compute the high resolution time value based upon the count value, the first voltage value, and the second voltage value.

4. The system of claim 1,
- further comprising third ramp circuitry adapted to output a third voltage ramp; and
- wherein the computation circuitry is adapted to compute the high resolution time value based upon the count value, and at least two of the first voltage value, the second voltage value, or a third voltage value of the third voltage ramp corresponding to the time that the timer circuitry received the event detection signal.

5. The system of claim 1, further comprising a clock adapted to output clock signals;

wherein the counter generates the count values based upon the clock signals;

wherein the first ramp circuitry is adapted to output first voltage ramps periodically;

wherein each ramp in the first voltage ramps has a duration in time that corresponds to 1.5 clock cycles of the clock;

wherein the second ramp circuitry is adapted to output second voltage ramps periodically; and wherein each ramp in the second voltage ramps has the duration in time that corresponds to 1.5 clock cycles of the clock.

6. The system of claim 1, wherein the timer circuitry is adapted to be initiated upon receipt of a start signal; and wherein the counter is adapted to generate count values in response to the timer circuitry receiving the start signal.

7. The system of claim 1, wherein the first ramp circuitry comprises a first capacitor and the second ramp circuitry comprises a second capacitor; and wherein the first voltage ramp corresponds to the first capacitor charging or discharging and the second voltage ramp corresponds to the second capacitor charging or discharging.

8. The system of claim 1, further comprising detector circuitry adapted to generate the event detection signal in response to the detector circuitry detecting an event, the detector circuitry comprising:

a scintillator adapted to emit light upon a neutron interacting with the scintillator; and a photomultiplier tube adapted to generate the event detection signal in response to the light emitted by the scintillator being detected by the photomultiplier tube.

9. The system of claim 1, further comprising detector circuitry adapted to generate the event detection signal in response to the detector circuitry detecting an event, the detector circuitry comprising:

an array of single photon avalanche diodes (SPADs), wherein a SPAD in the array of SPADs is adapted to generate the event detection signal in response to a neutron impinging upon the SPAD.

10. A system comprising:

detector circuitry comprising:

an array of photodetectors, a photodetector in the array of photodetectors being adapted to generate a detection signal in response to a neutron dislodging a charged particle in the photodetector, the detection signal indicating that the detector circuitry has detected the neutron; and timer circuitry being electrically coupled to the detector circuitry, the timer circuitry comprising:

a counter adapted to output count values;

first ramp circuitry adapted to output a first voltage ramp, a voltage of the first voltage ramp increasing or decreasing with respect to time; and second ramp circuitry adapted to output a second voltage ramp, a voltage of the second voltage ramp increasing or decreasing with respect to time;

wherein the timer circuitry is adapted to generate a value that is indicative of a time that the photodetector generated the detection signal based upon a count value in the count values that corresponds to the time that the photodetector generated the detection signal, upon a voltage value of the first voltage ramp that corresponds to the time that the photodetector generated the detection signal, and upon a second voltage value of the second voltage ramp that corresponds to the time that the photodetector generated the detection signal, the value having a resolution in time of between 1-5 picoseconds.

11. The system of claim 10, wherein the array of photodetectors is an array of single photon avalanche diodes (SPADs).

12. The system of claim 10, wherein the array of photodetectors comprises a second photodetector, the second photodetector being adapted to generate a second detection signal in response to a second neutron displacing a second charged particle in the second photodetector, the second detection signal indicating that the detector circuitry has detected the second neutron.

13. The system of claim 10, further comprising an array of pixels that comprises the array of photodetectors, respectively, each pixel in the array of pixels comprising an instance of the timer circuitry.

14. A system comprising:

detector circuitry, the detector circuitry comprising:

an array of photodetectors, a photodetector in the array of photodetectors being adapted to generate a detection signal in response to a neutron dislodging a charged particle in the photodetector, the detection signal indicating that the detector circuitry has detected the neutron; and timer circuitry being electrically coupled to the detector circuitry, the timer circuitry comprising:

a counter adapted to generate count values;

first ramp circuitry adapted to output a first voltage ramp, a voltage of the first voltage ramp increasing or decreasing with respect to time;

second ramp circuitry adapted to output a second voltage ramp, a voltage of the second voltage ramp increasing or decreasing with respect to time; and computation circuitry adapted to compute a high resolution time value that is indicative of a time that the detector circuitry detected the neutron, the high resolution time value having a resolution of 1-5 picoseconds, the computation circuitry being adapted to compute the high resolution time value based upon:

a count value generated by the counter that corresponds to the time that the detector circuitry generated the detection signal; and at least one of:

a first voltage value of the first voltage ramp, the first voltage value corresponding to the time that the detector circuitry generated the detection signal; and a second voltage value of the second voltage ramp, the second voltage value corresponding to the time that the detector circuitry generated the detection signal.

* * * * *